S. P. PAETTA.
TRAP.
APPLICATION FILED AUG. 25, 1921.
1,421,298.
Patented June 27, 1922.
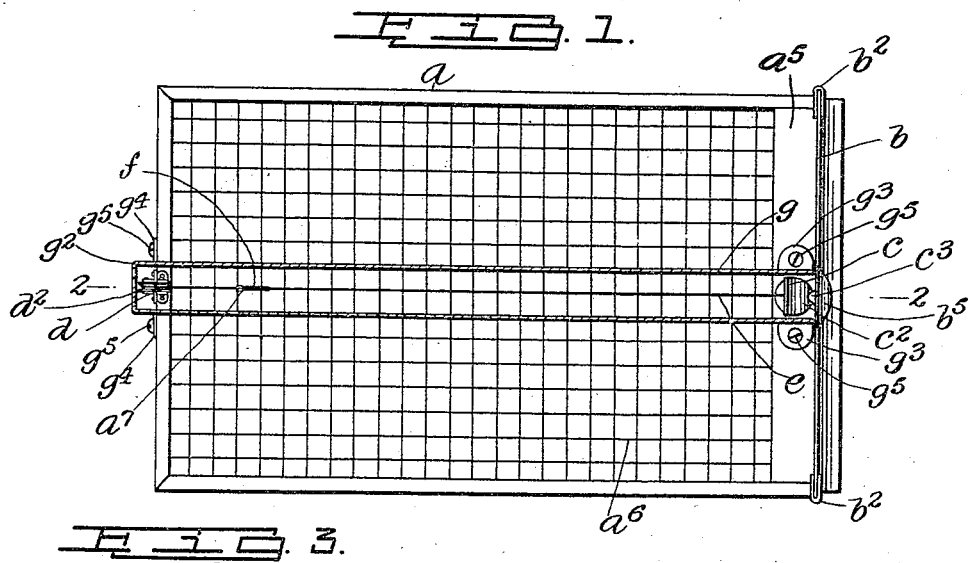
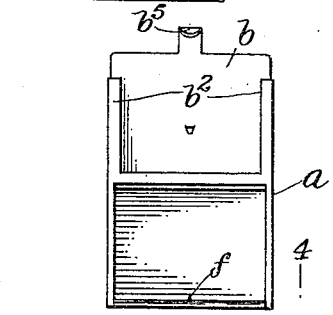
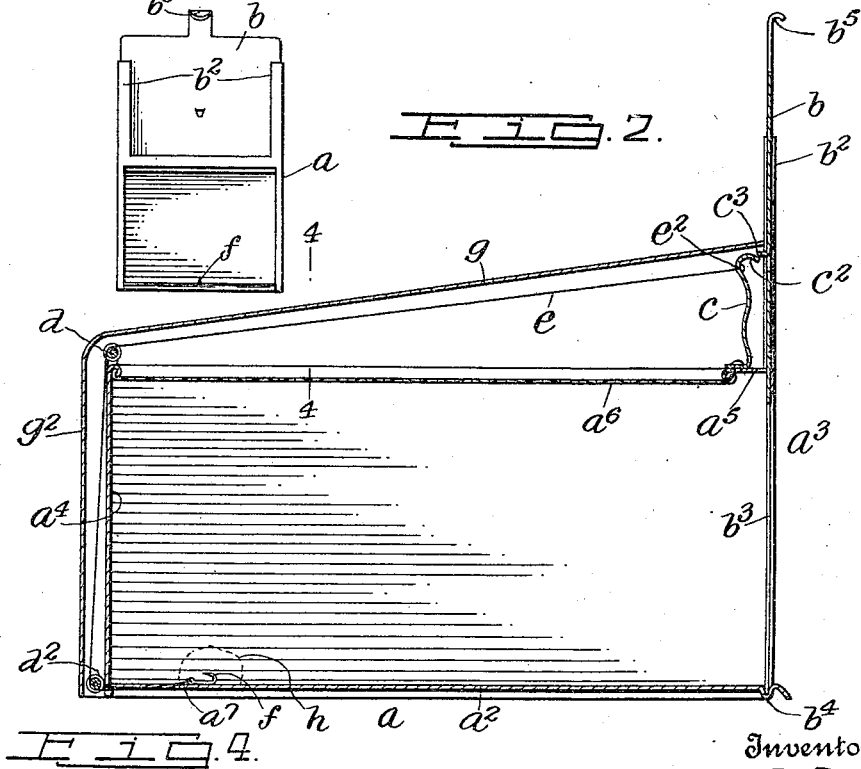
Inventor
Santin P. Paetta
By his Attorneys

UNITED STATES PATENT OFFICE.

SANTIN P. PAETTA, OF NEW YORK, N. Y.

TRAP.

1,421,298. Specification of Letters Patent. Patented June 27, 1922.

Application filed August 25, 1921. Serial No. 495,217.

*To all whom it may concern:*

Be it known that I, SANTIN P. PAETTA, a citizen of the United States, and residing at Coney Island, New York, in the county of Kings and State of New York, have invented certain new and useful Improvements in Traps, of which the following is a specification, such as will enable those skilled in the art to which it appertains to make and use the same.

This invention relates to traps for catching rats and other small animals such as mink, weazel, muskrats and the like; and the object thereof is to provide a trap of the class specified which has but little resemblance to an ordinary trap and will thus more readily serve for the purpose for which it is made; a further object being to provide a trap of the class specified which is simple in construction, efficient in use, and comparatively inexpensive, and which is constructed and operates as hereinafter described and claimed.

The invention is fully disclosed in the following specification, of which the accompanying drawing forms a part, in which the separate parts of my improvement are designated by suitable reference characters in each of the views, and in which:—

Fig. 1 is a plan view of my improved trap with part of the construction shown in section;

Fig. 2 a central vertical longitudinal section through the trap;

Fig. 3 a front view of the trap; and,

Fig. 4 a partial section on the line 4—4 of Fig. 2.

In the practice of my invention, I provide a box $a$ which is preferably oblong and rectangular in form as shown and which, in the construction shown, is made of sheet metal but which may be made of wood, hard pressed fibrous board, or any other suitable material.

The box $a$ comprises a bottom $a^2$, and front and rear ends $a^3$ and $a^4$ and a front transverse end board $a^5$ rearwardly of which is a wire mesh screen $a^6$ or other suitable openwork material. In the construction shown the wire mesh screen $a^6$ covers the entire top of the box rearwardly of the board $a^5$, but this is not necesary as only a part of said top may be formed this way, and the object thereof is to provide means whereby the interior of the box or trap as well as any animal caught therein may be seen.

Mounted in the front end $a^3$ of the box is a vertically movable door $b$ and at the opposite sides of the box and at the front end thereof are vertical U-shaped keepers $b^2$ in which said door operates, and the opposite sides and the bottom of the box are provided with similar keepers $b^3$ and $b^4$, the door being movable in the keeper $b^3$ and the lower end thereof being adapted to enter the keeper $b^4$ in the front end of the bottom of the box.

Secured centrally of the top board $a^5$ is a spring trigger device $c$, the top of which is provided with a forwardly and downwardly directed nose piece $c^2$ and the door $b$ is provided approximately centrally thereof with an inwardly directed tongue $c^3$, which is adapted to bear on the nose $c^2$ of the trigger piece $c$ when said door is in the open position as shown in Figs. 2 and 3.

At the top of the rear end portion of the box and centrally thereof is mounted a grooved wheel $d$ and at the bottom of said end of the box is a grooved wheel $d^2$, and a cord $e$ is connected with the top portion of the trigger piece $c$ as shown at $e^2$ and carried downwardly and backwardly and passed over the grooved wheel $d$, and thence downwardly and around the grooved wheel $d^2$, and the free end of this cord is passed forwardly under the rear end of the bottom part $a^2$ and up through a small aperture $a^7$ formed therein and provided with a bait hook $f$.

The cord $e$ is provided with a U-shaped covering or shield $g$ having a downwardly directed rear end portion $g^2$, and this shield encloses that part of the cord $e$ which is outside of the box and prevents any interference therewith by rats, mice or other animals.

The door $b$ is provided centrally thereof with a hook-shaped handle member $b^5$, and in setting my improved trap for use the bait $h$ is connected with the hook $f$ and the door is raised into the position shown in Figs. 2 and 3, in which position the tongue $c^3$ of the door will rest on the nose piece $c^2$ of the trigger device $c$ and if a rat or other animal enters the trap through the open door and pulls on the bait $h$, the cord $e$ will be operated to move the trigger piece $c$ backwardly and the door will drop into its closed position, and the rat or other animal will be caught as will be readily understood.

The shield $g$ is provided, in the construction shown, and at the ends thereof, with ears $g^3$ and $g^4$ through which are passed screws $g^5$ securing said shield in position, but said shield may be secured in place in any desired manner, but this operation should be performed so as to permit the detachment of said shield whenever necessary in order to put in a new cord or make other repairs.

It will be understood that my improved trap may be made of any desired size, the size thereof depending on the size of the animal or animals which it is desired to catch, and while I have shown and described what may be considered as the preferred details of construction, my invention is not limited to such details, and changes therein and modifications thereof may be made, within the scope of the appended claims, without departing from the spirit of my invention or sacrificing its advantages.

Having fully described my invention, what I claim as new and desire to secure by Letters Patent, is:—

1. A trap comprising a box member provided with a vertically movable door, a spring trigger device mounted in connection with the top of said box and operating in connection with a tongue with which the door is provided, said box being also provided at the top and bottom thereof opposite the door with external grooved wheels, and a cord connected with the trigger device and passed backwardly and downwardly and around said grooved wheels beneath the box member and upwardly into the bottom of the box member and provided with a bait attachment therein.

2. A trap comprising a box member provided with a vertically movable door, a spring trigger device mounted in connection with the top of said box and operating in connection with a tongue with which the door is provided, said box being also provided at the top and bottom thereof opposite the door with external grooved wheels, a cord connected with the trigger device and passed backwardly and downwardly and around said grooved wheels beneath the box member and upwardly into the bottom of the box member and provided with a bait attachment therein and said cord and said grooved wheels being provided with a shield.

3. In a trap of the class described, a box provided at one end thereof with a vertically movable door, a spring trigger device mounted in connection with the top of the box and operating in connection with said door to hold the same in a raised position, a cord connected with said trigger device and extending downwardly and backwardly over the box outside of the rear end thereof and the free end portion of which is passed beneath and upwardly through the bottom of the box and provided with a bait attachment therein.

4. In a trap of the class described, a box provided at one end thereof with a vertically movable door, a spring trigger device mounted in connection with the top of the box and operating in connection with said door to hold the same in a raised position, a cord connected with said trigger device and extending downwardly and backwardly over the box outside of the rear end thereof and the free end portion of which is passed beneath and upwardly through the bottom of the box and provided with a bait attachment therein, and a sheet metal shield for said cord.

5. In a trap of the class described, a box provided at one end thereof with a vertically movable door, a spring trigger device mounted in connection with the top of the box and operating in connection with said door to hold the same in a raised position, a cord connected with said trigger device and extending downwardly and backwardly over the box outside of the rear end thereof and the free end portion of which is passed beneath and upwardly through the bottom of the box and provided with a bait attachment therein, a sheet metal shield for said cord, said box being open at the top and an openwork closure for the top of said box.

In testimony that I claim the foregoing as my invention I have signed my name in presence of the subscribing witnesses this 24th day of August, 1921.

SANTIN P. PAETTA.

Witnesses:
C. E. MULREANY,
H. E. THOMPSON.